United States Patent
Cao et al.

(10) Patent No.: US 8,462,788 B2
(45) Date of Patent: Jun. 11, 2013

(54) METHOD, SYSTEM AND NETWORK NODE FOR SETTING UP A LABEL SWITCHING PATH

(75) Inventors: Wei Cao, Guangdong (CN); Xinchun Guo, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 13/102,871

(22) Filed: May 6, 2011

(65) Prior Publication Data

US 2011/0211579 A1 Sep. 1, 2011

Related U.S. Application Data

(63) Continuation of application No. PCT/CN2009/072194, filed on Jun. 9, 2009.

(30) Foreign Application Priority Data

Nov. 6, 2008 (CN) .......................... 2008 1 0225578

(51) Int. Cl.
*H04L 12/28* (2006.01)
*H04L 12/56* (2006.01)

(52) U.S. Cl.
USPC ...................................... 370/392; 370/395.1

(58) Field of Classification Search
USPC ...................................... 370/389, 392, 395.1
See application file for complete search history.

(56) References Cited

U.S. PATENT DOCUMENTS

2002/0071390 A1* 6/2002 Reeves et al. ................. 370/235
2008/0025309 A1* 1/2008 Swallow ....................... 370/392

FOREIGN PATENT DOCUMENTS

| CN | 1601971 A | 3/2005 |
|---|---|---|
| CN | 1921453 A | 2/2007 |
| CN | 101197814 A | 6/2008 |
| WO | WO 2008/016558 A2 | 2/2008 |

OTHER PUBLICATIONS

Communication dated Jul. 25, 2012 in connection with European Patent Application No. 09 824 354.6.
C. Filsfils, et al., "Load Balancing Fat MPLS Pseudowires", Jul. 9, 2008, 13 pages.
Martini et al., "Pseudowire Setup and Maintenance Using the Label Distribution Protocol (LDP)", Apr. 2006, 33 pages.
Written Opinion of the International Searching Authority dated Sep. 17, 2009 in connection with International Patent Application No. PCT/CN2009/072194.
G. Swallow, et al., "Avoiding Equal Cost Multipath Treatment in MPLS Networks", Network Working Group, Jun. 2007, 9 pages.
International Search Report dated Sep. 17, 2009 in connection with International Patent Application No. PCT/CN2009/072194.

* cited by examiner

*Primary Examiner* — Ronald Abelson

(57) ABSTRACT

The present invention relates to communications technologies and discloses a method, a system, and a label switching router for setting up a Label Switching Path (LSP). The method includes: an ingress edge node sends a label request packet to a downstream node, where the label request packet carries an Equal Cost Multi-Path (ECMP) property flag of a Forwarding Equivalence Class (FEC); the downstream node that receives the label request packet sends the label request packet to a next-hop node according to the property flag; and the node that receives the label request packet performs label mapping according to a path of the label request packet, binds a label to the FEC, and sets up an LSP. An ECMP property flag indicating setting up an ECMP route is permitted is introduced in the process of setting up an LSP. Therefore, setup of an ECMP route is prevented for the FEC that imposes special requirements, and management and maintenance of the network are facilitated.

11 Claims, 9 Drawing Sheets

METHOD, SYSTEM AND NETWORK NODE FOR SETTING UP A LABEL SWITCHING PATH

CROSS-REFERENCE TO RELATED APPLICATIONS

This application is a continuation of International Application No. PCT/CN2009/072194, filed on Jun. 9, 2009, which claims priority to Chinese Patent Application No. 200810225578.1, filed on Nov. 6, 2008, both of which are hereby incorporated by reference in their entireties.

TECHNICAL FIELD

The present invention relates to the communications field, and in particular, to a method, a system, and a network node for setting up a Label Switching Path (LSP).

BACKGROUND

Multi-Protocol Label Switching (MPLS) put forward by Internet Engineering Task Force (IETF) is a third-generation network architecture and a new-generation IP high-speed backbone switching standard. The MPLS integrates the IP routing technology and layer-2 switching. It adds the connection-oriented property of the MPLS in the connectionless-oriented IP network, and transplants the connectionless-oriented IP service to the connection-oriented label switching service to separate the route selection layer from the data forwarding layer.

In an MPLS network, an ingress Label Switching Router (LSR) sorts the packets that enter the network into Forwarding Equivalence Classes (FECs) according to different forwarding requirements, and maps each specific FEC to the next hop, namely, specifies an FEC for each specific packet that enters the network. Each specific FEC is coded as a short fixed-length value called "label", and a packet is encapsulated with the label so that the packet becomes a labeled packet which is then forwarded to the next hop. On each hop that follows, the packet header does not need to be analyzed any longer, but the label is used as a pointer which points to the next-hop output port and a new label. The new label replaces the old label of the labeled packet and then the packet is forwarded through the specified output port. An egress LSR removes the label and forwards the packet to the destination through an Internet Protocol (IP) routing mechanism. Compared with the traditional IP routing mode, the MPLS analyzes the IP packet header only at the network edge when forwarding data, without having to analyze the IP packet header at every hop, which saves the processing time.

In the process of setting up an MPLS label forwarding path, the label is bound to the FEC through a label allocation protocol. Currently, many label allocation protocols are available. Label Distribution Protocol (LDP) is a protocol developed for distributing labels. The LDP is a process of negotiating with the LSR about the meaning of the label. Through the LDP, the LSR can map the route information of the network layer to the switching path of the data link layer directly, so as to set up an LSP on the network layer. LSRs are interconnected according to information corresponding to a specific FEC in the local forwarding table. Such information includes ingress label, next-hop node, and egress label. An LSP can be set up between two adjacent LSRs or terminated at the egress node of the network. In this way, label switching is applied onto all intermediate nodes in the network, and an LSP that spans the whole MPLS domain is generated.

The LDP depends on the existing routing protocol when setting up an LSP. That is, the LDP works together with traditional routing protocols such as Open Shortest Path First (OSPF) and Intermediate System to Intermediate System (IS-IS) protocol to set up a routing table and a label mapping table for the FEC in each LSR. The LDP sends a label request packet or label mapping packet to the LSR according to information in the routing table.

As mentioned above, the LDP sets up the LSP based on the route discovered by the routing protocol. As long as a route exists, the LDP sends a Hello packet to the corresponding neighbor to set up a neighboring relation, and set up an LDP session and a peer-to-peer relation. When an equal cost route exists in the routing table, the LDP sets up an equal cost path for the data streams of the same FEC. Equal-Cost MultiPath (ECMP) routing means that multiple routes reach the same destination, and all routes have the same measure and priority. The ECMP routing applied in forwarding a packet in the equal cost route varies with the local policy, and therefore, packets arrive at the destination through different paths. The paths are mutually redundant and share load.

The inventor of the present invention finds that: The equal cost path increases the bandwidth available to the user, and enhances failover flexibility and load balance capability of links to some extent, but brings some adverse effects to MPLS networks, especially to transmission-oriented MPLS networks.

The existence of equal cost paths imposes higher requirements on the node device in processing IP and MPLS packet headers. Because all routes have the same measure and priority, different ECMP algorithms are applied to select an equal cost path for forwarding each packet according to the local policy and the information of the IP and MPLS packet header. That increases the device overload for processing packets, and imposes higher requirements on processing for packets.

The existence of equal cost paths may lead to disorder when packets in the same stream arrive at the destination. One of the equal cost paths is selected for forwarding a packet, and each packet incurs different network delays when being forwarding on different paths. Therefore, the packets may be disordered when they arrive at the destination, which is intolerable to certain services that need to impose special requirements.

Due to defects of the current load balance algorithm, the existence of the ECMP routing leads to congestion or Dial of Service (DoS) on some links. The current load balance algorithm is inefficient, and the Network Management System (NMS) is unaware of the congestion or DoS on certain links, which leads to low efficiency of using the links.

It is difficult to manage or maintain the network, or implement Operation Administration Maintenance (OAM). In the MPLS, the network management plane is separated from the data forwarding plane, and the control plane is unable to perceive faults of the data plane. Due to uncertainty of the ECMP route that conveys the data stream, the traditional MPLS detection tool can hardly detect the fault of the data plane, which makes it difficult to run, manage and maintain the network and implement OAM functions.

The RFC4928 in the prior art is a solution to disorder of packets in the same stream when an ECMP route exists in an MPLS network. In this solution, the IP protocol field of the packet or the MPLS label stack is probed and different ECMP algorithms are applied, and therefore, all packets in the same stream are forwarded by the same path, and the disorder of packets on the ECMP route is prevented. However, such a solution is defective in that: An ECMP route is set up first, the IP protocol field or label stack of the packet is probed at the time of forwarding the packet, and an ECMP algorithm is applied but the packet does not use the ECMP route, which increases network processing overload and imposes higher requirements on network devices in processing packets.

SUMMARY

The embodiments of the present invention provide a method, a system and a network node for setting up an LSP. The technical solution under the present invention is as follows:

A method for setting up an LSP in an embodiment of the present invention includes:

An ingress edge node sends a label request packet to a downstream node, where the label request packet carries an ECMP property flag of a FEC.

The downstream node that receives the label request packet sends the label request packet to a next-hop node according to the property flag.

The node that receives the label request packet performs label mapping according to a path of the label request packet, distributes a label based on the FEC, and sets up an LSP.

Another method for setting up an LSP in an embodiment of the present invention includes:

An egress edge node sends a label mapping packet to an upstream node, where the label mapping packet carries an ECMP property flag of a FEC.

The upstream node that receives the label mapping packet distributes a label based on the FEC according to the property flag, and sends the label mapping packet to a next-hop upstream node.

An ingress edge node that receives the label mapping packet distributes a label based on the FEC, and sets up an LSP.

A network node provided in an embodiment of the present invention includes:

a first receiving module, configured to receive a label request packet that carries an ECMP property flag of a FEC;

a request packet processing module, configured to send the label request packet to a next-hop node according to the property flag; and a mapping module, configured to perform label mapping according to a path of the label request packet, distribute a label based on the FEC, and set up an LSP.

Another network node provided in an embodiment of the present invention includes:

a second receiving module, configured to receive a label mapping packet that carries an ECMP property flag of a FEC;

a processing module, configured to distribute a label based on the FEC according to the property flag; and a sending module, configured to send the label mapping packet.

An edge network node provided in an embodiment of the present invention includes:

an obtaining module, configured to obtain an ECMP property flag of a FEC;

a packet sending module, configured to send a label request packet or label mapping packet that carries the ECMP property flag of the FEC; and a label binding module, configured to distribute a label based on the FEC.

A system provided in an embodiment of the present invention includes:

an edge network node, configured to obtain an ECMP property flag of a FEC, send a label request packet or label mapping packet that carries the ECMP property flag of the FEC, and distribute a label based on the FEC; and an intermediate network node, configured to receive the label request packet or label mapping packet that carries the ECMP property flag of the FEC; send the label request packet to a next-hop node according to the property flag, perform label mapping according to a path of the label request packet, distribute a label based on the FEC, and set up an LSP; and distribute a label based on the FEC according to the property flag, and send the label mapping packet.

The technical solution under the present invention brings at least the following benefits:

The LDP protocol packet is extended so that the label mapping packet or label request packet carries a flag indicating that setting up an ECMP route is permitted or setting up an ECMP route is not permitted; in the process of setting up an LSP, the setup of an ECMP route is prevented for the FEC that imposes special requirements on disorder and OAM; in the process of setting up an LSP, the property flag of the ECMP route is carried in the packet, the setup of an ECMP route is prevented automatically without the need of setting up every LSR on the LSP, the problems brought by the ECMP are prevented (for example, disorder of packets, congestion of some links, and difficulty of OAM), and management and maintenance of the MPLS network are facilitated.

DETAILED DESCRIPTION

Figure 1:
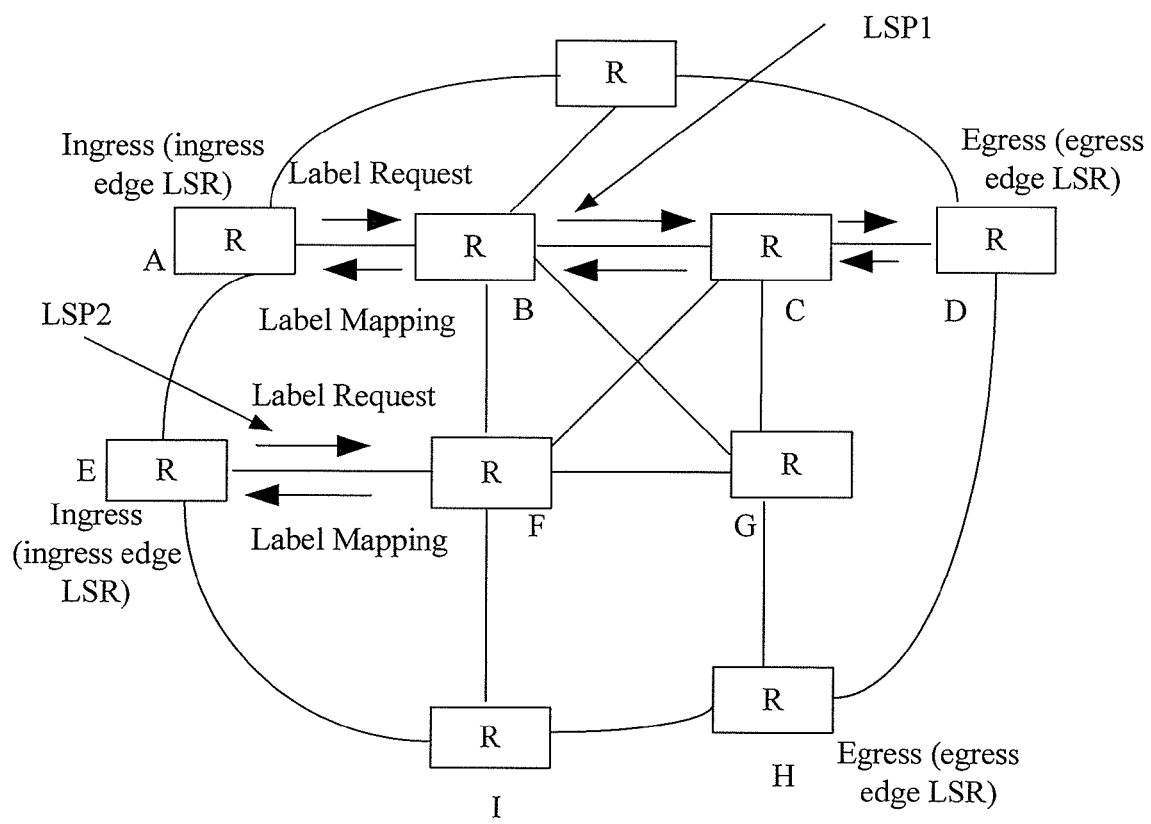
FIG. 1 shows an LDP label distribution process provided in an embodiment of the present invention.

To make the technical solution, objectives and merits of the present invention clearer, the following describes the embodiments of the present invention in more detail with reference to the accompanying drawings.

In the embodiments of the present invention, the LDP protocol packet is extended so that the packet carries an ECMP property flag. The ECMP property flag serves as a basis for deciding for the FEC that setting up an ECMP route is permitted or setting up an ECMP route is permitted.

In the embodiments of the present invention, the LDP protocol packet is extended so that the label request packet or label mapping packet carries an ECMP property flag indicating that setting up an ECMP route is permitted or setting up an ECMP route is not permitted. By determining the ECMP property flag carried in the received label request packet or label mapping packet, the LSR decides whether to send the label request packet or whether to distribute a label, and transmits the ECMP property flag to the whole MPLS network from one hop to another, therefore preventing setup of the ECMP route for a specific FEC. The specific FEC may be the FEC that imposes special requirements on such as disorder and OAM in a practical environment, for example, the FEC that imposes higher requirements on OAM; or the FEC that imposes higher requirements on such as disorder and OAM and expressly requires that setting up an ECMP route is not permitted in the transmission-oriented MPLS.

The LDP protocol packet carries different types of information through Type Length Value (TLV). The format of FEC TLV in the prior art is as follows:

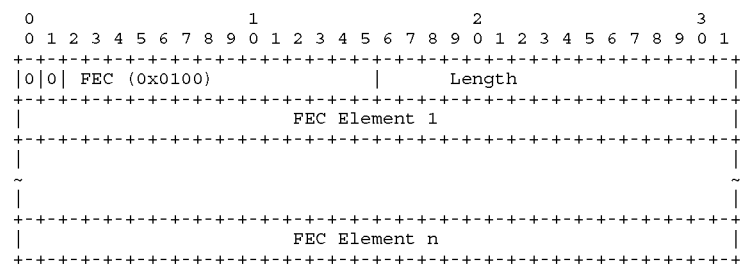

The meanings of fields in the foregoing FEC TLV are described below:

FEC: type of object, namely, "Type" in TLV;

Length: length of FEC TLV; and

FEC Element 1-FEC Element n: values of FEC TLV.

In the embodiments of the present invention, the LDP protocol packet is extended so that the label request packet or label mapping packet carries an ECMP property flag. The extending may be implemented by extending the existing TLV or adding a new TLV, as detailed below:

An ECMP property flag bit is added into the FEC TLV, and the format of TLV is:

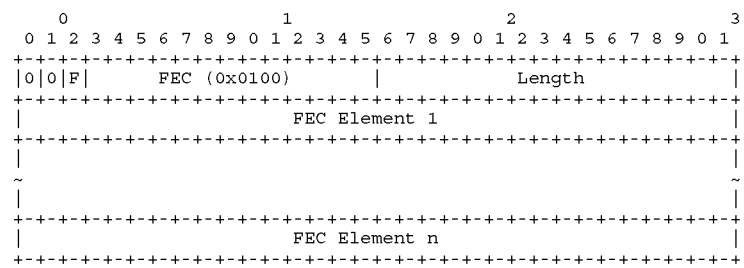

In the FEC TLV above, an F bit is added to indicate the ECMP property. The meanings of the values of the F bit are: Value "0" indicates NO-ECMP (namely, setting up an ECMP route is not permitted); value "1" indicates ECMP-OK (namely, setting up an ECMP route is permitted).

The ECMP Sub-TLV is extended in the FEC TLV so that the format of the TLV is:

In the TLV above, ECMP Sub-TLV indicates the extended property, and the format of TLV is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0|    ECMP sub-Tlv (Reserved)   |       Length (Reserved)    |
+-+-+-+-+-+-+-+-+-+-+-+-+-+-+-+-+-+-+-+-+-+-+-+-+-+-+-+-+-+-+-+-+
|NO-ECMP/ECMP-OK|                Reserved                       |
+-+-+-+-+-+-+-+-+-+-+-+-+-+-+-+-+-+-+-+-+-+-+-+-+-+-+-+-+-+-+-+-+
```

In the format above, ECMP Sub-Tlv (reserved) indicates that the TLV is a sub-TLV of the extended ECMP property in the FEC TLV, and "reserved" means that the value is variable and assigned; "NO-ECMP or ECMP-OK" indicates property of an object, and occupies 1 bit, whose value is 0 or 1 indicating that setting up an ECMP route is permitted or setting up an ECMP route is not permitted respectively; and "Reserved" indicates that the field is reserved.

The newly added ECMP indicates the TLV. The format of the newly added ECMP-TLV is:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|0|0|      ECMP Tlv (Reserved)     |       Length (Reserved)    |
+-+-+-+-+-+-+-+-+-+-+-+-+-+-+-+-+-+-+-+-+-+-+-+-+-+-+-+-+-+-+-+-+
|NO-ECMP/ECMP-OK|                Reserved                       |
+-+-+-+-+-+-+-+-+-+-+-+-+-+-+-+-+-+-+-+-+-+-+-+-+-+-+-+-+-+-+-+-+
```

In the TLV above, NO-ECMP or ECMP-OK indicates that setting up an ECMP route is not permitted or setting up an ECMP route is permitted respectively.

In the second method in the prior art described above, the ECMP Sub-TLV is extended on the basis of FEC TLV. In the method provided herein, the newly added ECMP-TLV is not a result of extending the ECMP TLV on the basis of the existing FEC TLV format, namely, the newly added ECMP-TLV is parallel to rather than inclusive of the FEC TLV.

The extending of the FEC TLV and the adding of the ECMP-TLV mentioned above are only exemplary modes of enabling the label request packet or label mapping packet to carry the ECMP property flag. In practice, the ECMP property flag may be carried in other different packets, and the composition of the TLV frame is not limited.

A method for setting up an LSP is provided in an embodiment of the present invention, in which a network node transmits an LDP protocol packet. The method includes:

an ingress edge node sends a label request packet to a downstream node of the ingress edge node, where the label request packet carries an ECMP property flag of a FEC;

the downstream node that receives the label request packet sends the label request packet to a next-hop node of the downstream node according to the property flag; and the node that receives the label request packet performs label mapping according to a path of the label request packet, distributes a label based on the FEC, and sets up an LSP.

Another method for setting up an LSP is provided in an embodiment of the present invention, in which a network node transmits an LDP protocol packet. The method includes:

an egress edge node sends a label mapping packet to an upstream node of the egress edge node, where the label mapping packet carries an ECMP property flag of a FEC;

the upstream node that receives the label mapping packet distributes a label based on the FEC according to the property flag, and sends the label mapping packet to a next-hop upstream node of the upstream node; and after receiving the label mapping packet, an ingress edge node distributes a label based on the FEC, and sets up an LSP.

While the LDP sets up an LSP, the ECMP property flag (indicating permission or no permission of setting up an ECMP) is carried in either of an LDP protocol packet (namely, label request packet or label mapping packet), and is gradually extended across the whole MPLS network as a basis for deciding whether to set up an ECMP route for the FEC or not. This embodiment assumes that the network node is LSR.

FIG. 1 shows an LDP label distribution process provided in an embodiment of the present invention. As shown in FIG. 1, the LDP sets up an LSP in two modes: Downstream on Demand (DoD), and Downstream Unsolicited (DU). In DoD mode, the upstream LSR generally selects the downstream LSR according to the information in the routing table, and sends a label request packet to the downstream LSR. The label request packet carries FEC description information. The downstream LSR allocates a label to the FEC according to the received label request packet, and reports the allocated label to the upstream LSR through a label mapping packet.

In DU mode, the downstream LSR sends a label mapping packet to the upstream LSR proactively after the LDP session is set up successfully, without waiting for the upstream LSR to send the label request packet. The upstream LSR stores the label mapping packet, and processes the received label mapping packet according to the routing table information and the applied label retaining mode. When the property of the received label changes, the downstream LSR sends a label mapping packet that carries the new property to the upstream LSR.

The DoD mode and the DU mode may be further categorized into independent mode and ordered mode, depending on the label control mode selected by the LSR, namely, depending on when the LSR feeds back the label mapping packet. In independent mode, the LSR sends the label mapping packet to the upstream LSR immediately no matter whether the LSR receives a label mapping packet returned by the downstream LSR. In ordered mode, the LSR sends the label mapping packet to the upstream LSR only after the LSR receives a label mapping packet returned by the downstream LSR.

In FIG. 1, all LSRs on LSP1 employ the ordered mode; and all LSRs on LSP2 employ the independent mode. A-I identify LSRs; "ingress" indicates an ingress edge LSR; and "egress" indicates an egress edge LSR.

The following embodiments describe how the LDP prevents setup of an ECMP route for the FEC that impose special requirements in the process of setting up an LSP.

Embodiment 1

This embodiment deals with how the LDP sets up an LSP in DoD mode. In DoD mode, the upstream LSR requests the downstream LSR to map the label first. After receiving the label request packet from the upstream LSR, the downstream LSR sends a label mapping packet to the upstream LSR. In DoD mode, an ingress LSR sends the command or request indicating whether to set up an ECMP route. The command or request may be configured by the NMS on the ingress LSR.

Figure 2:
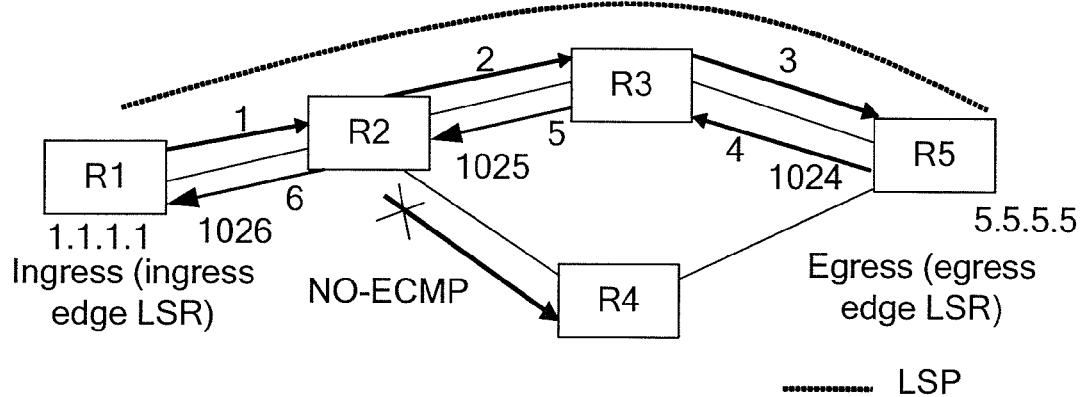
FIG. 2 is a topology view for preventing setup of an ECMP route in DoD mode in the first embodiment of the present invention.

FIG. 2 is a topology view for preventing setup of an ECMP route in DoD mode in an embodiment of the present invention. As shown in FIG. 2, it is assumed that FEC5.5.5.5 is a specific FEC requiring that setting up an ECMP route is not permitted. A NO-ECMP (indicating setting up an ECMP route is not permitted) command about FEC5.5.5.5 is configured on the ingress node. Therefore, the ingress node searches the routing table to decide the route to be used by the FEC, and sends a label request packet to the downstream node R2. The ingress node uses FEC5.5.5.5 as a destination prefix, and sends a label request packet to request a label for the destination prefix. The label request packet carries FEC information and an ECMP property flag. In FIG. 2, R1, R2, R3, R4 and R5 are five routers; "1", "2", and "3" indicate the order of sending the label request packets; "4", "5" and "6" indicate the order of sending the label mapping packets; "1024", "1025", and "1026" are label values of the label mapping packets sent to the upstream node; "1.1.1.1" is an ingress router and "5.5.5.5" is an egress router for FEC5.5.5.5; and "5.5.5.5" may also refer to the destination address prefix of FEC5.5.5.5.

Figure 3:
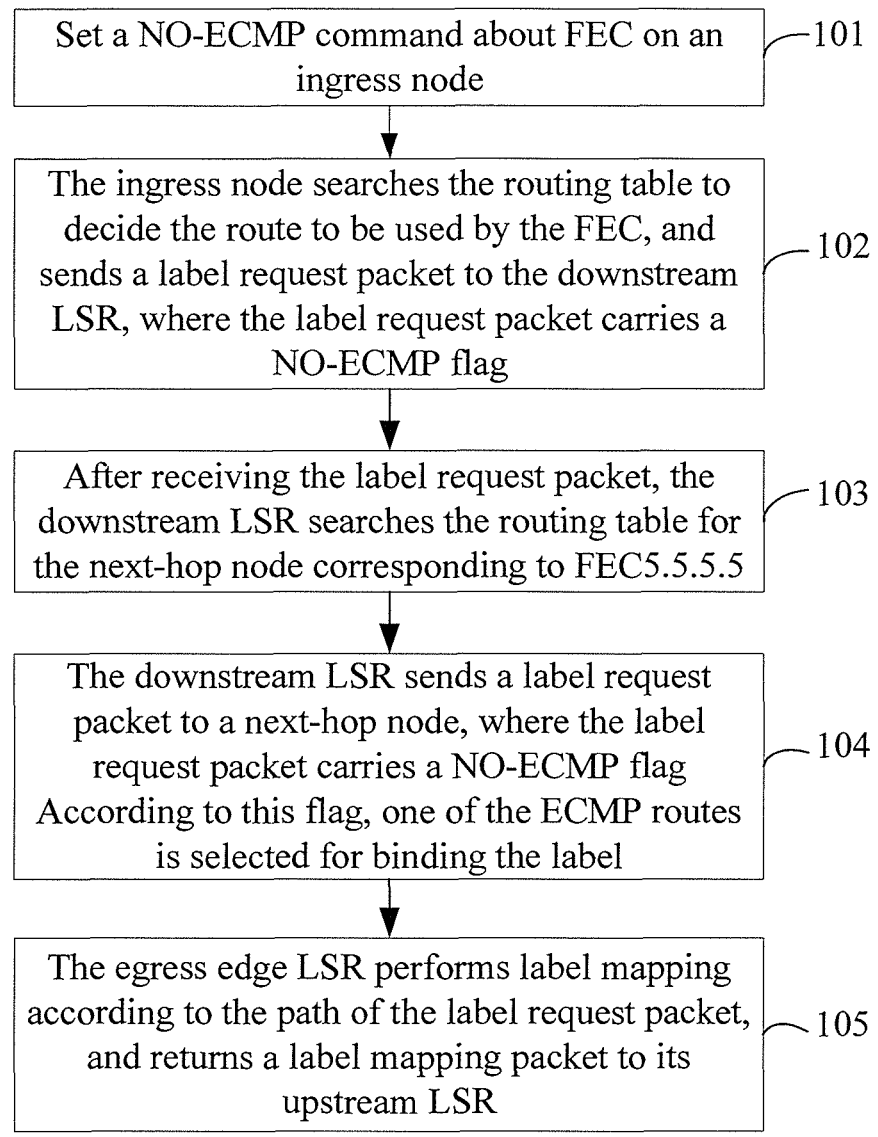
FIG. 3 is a flowchart of a method for setting up an LSP in the first embodiment of the present invention.

The following describes processing for NO-ECMP route setup with reference to the topology view shown in FIG. 2. FIG. 3 is a flowchart of a method for setting up an LSP based on the topology view shown in FIG. 2. The method includes the following steps:

101. Set a NO-ECMP command about FEC5.5.5.5 on an ingress node.

102. The ingress node searches the routing table to decide the route to be used by the FEC, and sends a label request packet to the downstream LSR. The label request packet carries a NO-ECMP flag.

In the topology view shown in FIG. 2, the downstream LSR of the ingress node (namely, R1) is R2. The ingress node sends a label request packet to R2. The label request packet carries a NO-ECMP flag about FEC5.5.5.5.

103. After receiving the label request packet, the downstream LSR searches the routing table for the next-hop node corresponding to FEC5.5.5.5.

104. The downstream LSR sends a label request packet to a next-hop node. The label request packet carries a NO-ECMP flag.

The downstream LSR sends the label request packet to the next-hop node in the following two scenarios:

(1) After receiving the label request packet, the downstream LSR searches the locally stored routing table for the egress interface and next-hop node corresponding to FEC5.5.5.5. If multiple egress interfaces and next-hop nodes corresponding to FEC5.5.5.5 are found and the label request packet received by the downstream LSR carries an ECMP property flag indicating NO-ECMP, the downstream LSR selects one of the egress interfaces and next-hop nodes according to the local policy, and sends a label request packet to the selected egress interface and next-hop node to request a label. The sent label request packet carries an ECMP property flag which is the same as the flag in the received label request packet, namely, carries a NO-ECMP flag.

(2) After receiving the label request packet, the downstream LSR searches the locally stored routing table for the egress interface and next-hop node corresponding to FEC5.5.5.5. If only one egress interface and next-hop node corresponding to FEC5.5.5.5 is found, the downstream LSR further sends a label request packet to its downstream LSR. The sent label request packet carries an ECMP property flag which is the same as the flag in the received label request packet.

As shown in FIG. 2, the downstream LSR of the ingress node (R1) is R2. After receiving the label request packet, R2 searches the locally stored routing table for the egress interface and next-hop node corresponding to FEC5.5.5.5. Two egress interfaces and next-hop nodes (namely, R3 and R4) are found, and the label request packet received by R2 carries a NO-ECMP flag. Therefore, R2 selects either R3 or R4 according to the local policy, and sends a label request packet to the selected R3 or R4 to request a label. In FIG. 2, R2 chooses to send the label request packet to R3, and the label request packet carries an ECMP property flag which is the same as the flag in the received label request packet, namely, carries a NO-ECMP flag. The local policy of R2 may be: R2 selects the next-hop node at its own discretion or according to preset configuration.

If R2 has only one egress interface and next-hop node, R2 further sends a label request packet to this node.

After receiving the label request packet, the downstream LSR performs the operations described in step 103 and 104. By analogy, the upstream LSR sends a label request packet that carries a NO-ECMP flag to the downstream LSR. The NO-ECMP flag is an indication of selecting one path of the ECMP for routing the label request.

105. The egress edge LSR performs label mapping according to the path of the label request packet, and returns a label mapping packet to its upstream LSR.

The egress edge LSR is a destination node about FEC5.5.5.5. After receiving the label request packet sent by the upstream LSR, the egress edge LSR returns a label mapping packet to the upstream LSR.

In the process of setting up an LSP, all downstream LSRs that receive the label request packet return a label mapping packet to their own upstream LSR according to the path of the label request packet.

The upstream LSR sends a label request packet to the downstream LSR, and the downstream LSR allocates a label to the FEC, and returns a label mapping packet that carries the bound label to the upstream LSR. Because the upstream LSR selects only one path for routing the label request, and the label mapping in DoD mode is based on the label request packet, the label mapping packet sent by the downstream LSR will also be routed in a single path.

The method for setting up an LSP in this embodiment is based on the label distribution process in DoD mode. An ECMP property flag is preset for the specific FEC on the ingress node; a label request packet is sent to the downstream LSR; if the packet carries a NO-ECMP flag, the downstream LSR selects the next-hop node according to the information in the routing table and the NO-ECMP flag. In view of the NO-ECMP flag, the downstream LSR selects only one next hop. Therefore, in the process of requesting the label, the upstream LSR selects only one path for routing the label request. Meanwhile, because the label mapping in DoD mode is based on the label request packet, the label request packet sent by the downstream LSR will also be routed on a single path. In this way, a NO-ECMP LSP (namely, non-ECMP LSP) is set up for the FEC.

Embodiment 2

This embodiment deals with how the LDP sets up an LSP in DU mode. In DU mode, the upstream LSR does not need to send any label request packet to the downstream LSR, but the downstream LSR sends the label mapping packet to the upstream LSR proactively after the LDP session is set up successfully. Therefore, in DU mode, an egress LSR sends the command or request indicating that setting up an ECMP route is permitted or setting up an ECMP route is not permitted. The command or request may be configured by the NMS on the egress LSR.

In DU mode, the time of returning the label mapping packet from the downstream LSR to the upstream LSR depends on whether the Independent mode or the Ordered mode is applied. In the DU Ordered mode, the intermediate node sends the label mapping packet to the upstream node after receiving the label mapping request from the downstream node; in the DU Independent mode, the intermediate node may send the label mapping packet to the upstream node before receiving the label mapping request from the downstream node. Therefore, the method for setting up an LSP in this embodiment varies between the Ordered mode and the Independent mode. The following describes the process of setting up an LSP in the DU Ordered mode, and the DU Independent mode will be described later.

Figure 4:
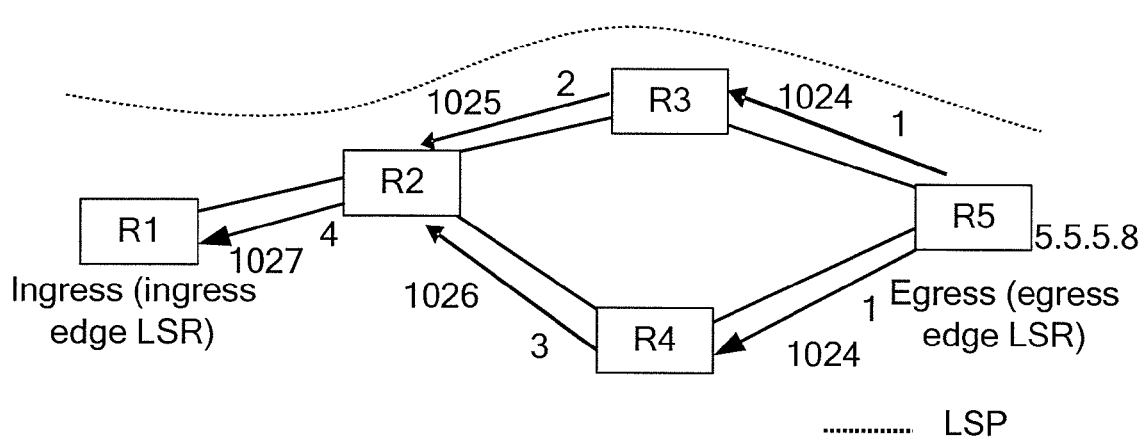
FIG. 4 is a topology view for preventing setup of an ECMP route in DU order mode in the second embodiment of the present invention.

FIG. 4 is a topology view for preventing setup of an ECMP route in a DU Ordered mode in an embodiment of the present invention. As shown in FIG. 4, it is assumed that FEC5.5.5.8 is a specific FEC requiring that setting up an ECMP route is not permitted. In FIG. 4, R1, R2, R3, R4 and R5 are five routers; "1", "2", "3", and "4" indicate the order of sending the label mapping packets; "1024", "1025", "1026", and "1027" are label values of the label mapping packets sent to the upstream node; "5.5.5.8" is an egress router for FEC5.5.5.8; and "5.5.5.8" may also refer to the destination address prefix of FEC5.5.5.8.

In this embodiment, along the data routing direction on an LSP, two adjacent LSRs are an upstream LSR and a downstream LSR. Therefore, "upstream node" and "downstream node" are termed with reference to the data routing direction on the LSP.

Figure 5:
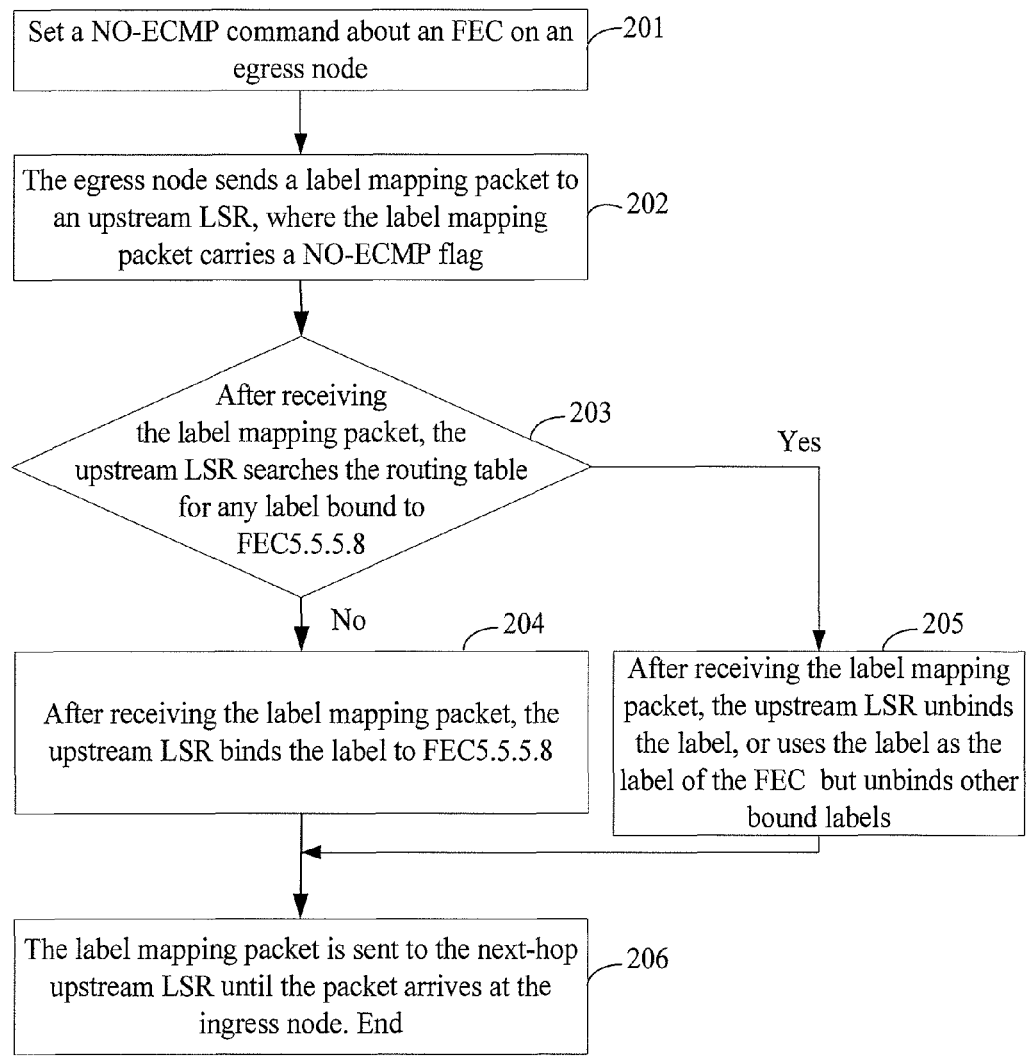
FIG. 5 is a flowchart of a method for setting up an LSP in the second embodiment of the present invention.

The following describes processing for NO-ECMP route setup with reference to the topology view shown in FIG. 4. FIG. 5 is a flowchart of a method for setting up an LSP based on the topology view shown in FIG. 4. The method includes the following steps:

201. Set a NO-ECMP command about an FEC on an egress node.

In this embodiment, a NO-ECMP command about FEC5.5.5.8 that requires no ECMP route in the forwarding process is configured on the egress node.

202. The egress node sends a label mapping packet to an upstream LSR. The label mapping packet carries a NO-ECMP flag.

203. After receiving the label mapping packet, the upstream LSR searches the routing table for any label bound to FEC5.5.5.8. If no such label is found, the procedure proceeds to step 204; if a label bound to FEC5.5.5.8 is found, the procedure proceeds to step 205.

As shown in FIG. 4, the egress node sends a label mapping packet to upstream R3 and R4. After receiving the label mapping packet, R3 and R4 checks the ECMP property flag in the label mapping packet. If the property flag is ECMP-OK, the processing is the same as the RFC processing in the prior art; if the property flag is NO-ECMP, R3 and R4 check their respective routing table, and find that destination prefix "5.5.5.8" about FEC5.5.5.8 exists in their routing table and that the received label mapping packet is sent by the downstream node of R3 and R4 in the route corresponding to FEC5.5.5.8. R3 and R4 check whether the corresponding FEC5.5.5.8 is bound to the label. If so, the procedure proceeds to step 205; if not, the procedure proceeds to step 204.

204. After receiving the label mapping packet, the upstream LSR binds the label to FEC5.5.5.8, and then performs step 206.

In FIG. 4, supposing that the upstream LSR that receives the label mapping packet is R3, R3 has only one downstream node, namely, R5; after receiving the label mapping packet, R3 finds that the destination address prefix "5.5.5.8" exists in the routing table; R3 searches the routing table to check whether the label mapping packet is sent by the downstream R5; after receiving a label mapping packet sent by R5, R3 searches the routing table and finds no label bound to this FEC, and therefore, R3 binds the label indicated in the packet to the FEC.

205. After receiving the label mapping packet, the upstream LSR unbinds the label, or uses the label as the label of the FEC but unbinds other bound labels.

In FIG. 4, supposing that the upstream LSR that receives the label mapping packet is R2, R2 has two downstream nodes, namely, R3 and R4; after receiving the label mapping packet, R2 finds that the destination address prefix "5.5.5.8" exists in the routing table; R2 searches the routing table to check whether the label mapping packet is sent by the downstream R3 or R4; when R2 receives a label mapping packet from R4 after receiving a label mapping packet from R3 and binding the label to FEC5.5.5.8, R2 searches the routing table and finds a label bound to FEC5.5.5.8, which indicates multiple egress labels and egress interfaces correspond to the destination prefix "5.5.5.8", namely, an equal cost route exists for this FEC, and therefore, R2 unbinds the label sent by R4, or uses the label sent by R4 as the label of the FEC but unbinds the label sent by R3, depending on the local policy. In this way, it is ensured that only one route is selected for binding the label.

206. The label mapping packet is sent to the next-hop upstream LSR until the packet arrives at the ingress node. The sent label mapping packet carries the ECMP property flag which is the same as the flag in the received label mapping packet.

After the LSR that receives the label mapping packet performs steps 203-205, the LSR sends the label mapping packet to the upstream LSR. The upstream LSR that receives the packet repeats the operations in steps 203-205, and the sending process goes on. All nodes in the MPLS network can obtain the NO-ECMP property flag, and the corresponding non-ECMP route is set up according to the flag.

The method for setting up an LSP in this embodiment is based on the label distribution process in the DU Ordered mode. An ECMP property flag is preset for the specific FEC on the egress node; a label mapping packet is sent to the upstream LSR; if the packet carries a NO-ECMP flag, the upstream LSR checks whether any label in the routing table has been bound to the FEC, and takes the corresponding action. In this way, the upstream LSR selects only one route for binding the label, and a NO-ECMP LSP (namely, non-ECMP LSP) is set up for the FEC.

Embodiment 3

This embodiment deals with how the LDP sets up an LSP in the DU Independent mode. In DU mode, the upstream LSR does not need to send any label request packet to the downstream LSR, but the downstream LSR sends the label mapping packet to the upstream LSR proactively after the LDP session is set up successfully.

Figure 6:
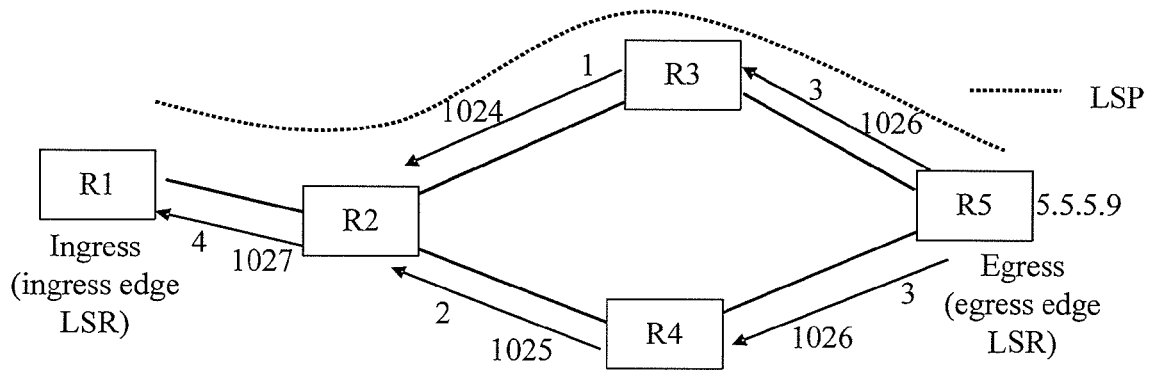
FIG. 6 is a topology view for preventing setup of an ECMP route in DU independent mode in the third embodiment of the present invention.

FIG. 6 is a topology view for preventing setup of an ECMP route in a DU Independent mode in an embodiment of the present invention. As shown in FIG. 6, it is assumed that FEC5.5.5.9 is a specific FEC requiring that setting up an ECMP route is not permitted. In FIG. 4, R1, R2, R3, R4 and R5 are five routers; "1", "2", "3", and "4" indicate the order of sending the label mapping packets; "1024", "1025", "1026", and "1027" are label values of the label mapping packets sent to the upstream node; "5.5.5.9" is an egress router for FEC5.5.5.9; and "5.5.5.9" may also refer to the destination address prefix of FEC5.5.5.9.

In this embodiment, the upstream node and the downstream node are termed with reference to the data routing direction in the LSP.

Figure 7:
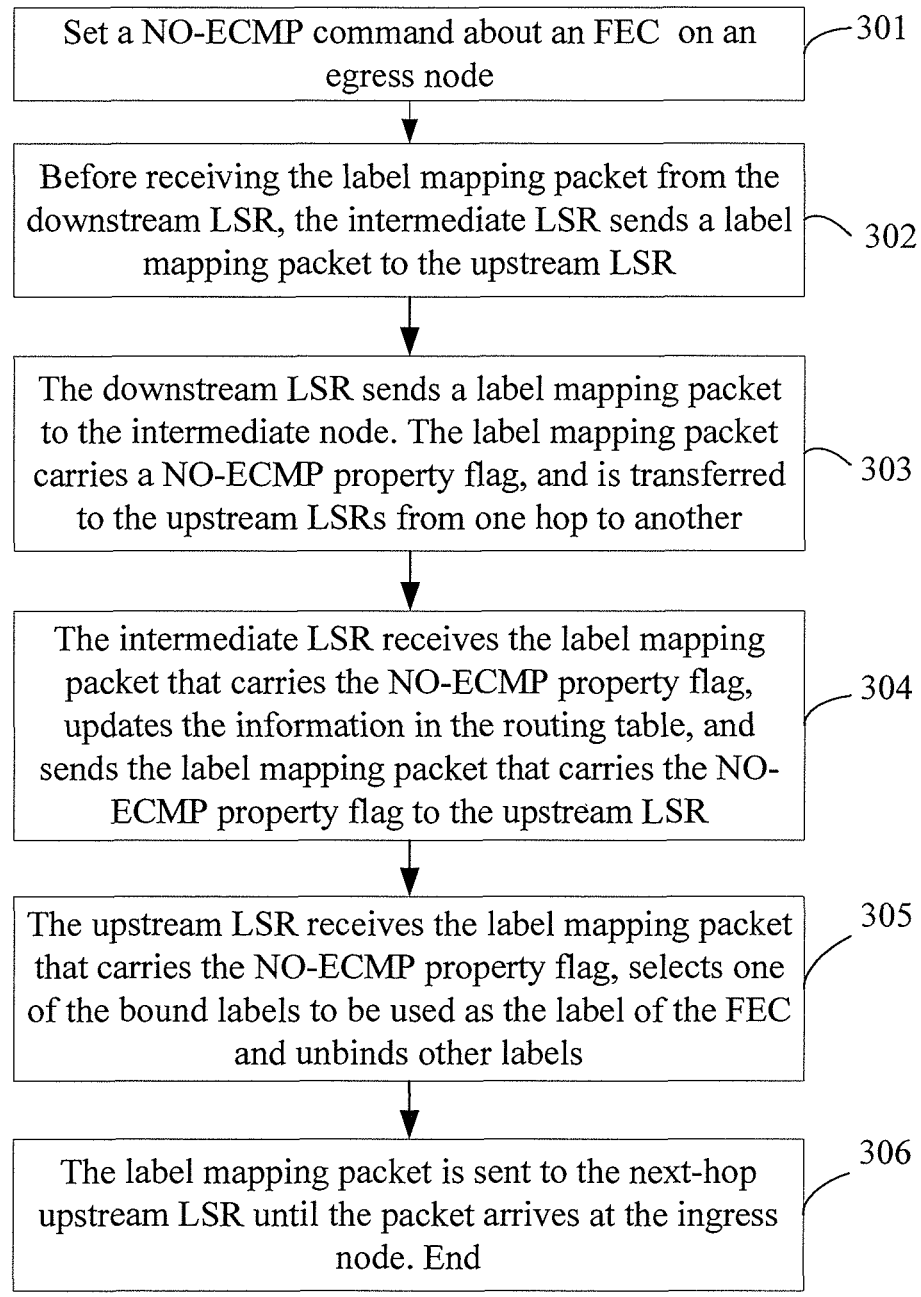
FIG. 7 is a flowchart of a method for setting up an LSP in the third embodiment of the present invention.

The following describes processing for path setup with reference to the topology view shown in FIG. 6. FIG. 7 is a flowchart of a method for setting up an LSP based on the topology view shown in FIG. 6. The method includes the following steps:

301. Set a NO-ECMP command about an FEC an egress node.

In this embodiment, a NO-ECMP command about FEC5.5.5.9 that requires no ECMP route in the forwarding process is configured on the egress node.

302. Before receiving the label mapping packet from the downstream LSR, the intermediate LSR sends a label mapping packet to the upstream LSR.

As shown in FIG. 6, intermediate R3 and R4 have sent the label mapping packet (indicating the binding relation between label 1024 and 1025 and FEC5.5.5.9) to the upstream R2 before receiving the label mapping packet sent by the downstream egress (R5).

303. The downstream LSR sends a label mapping packet to the intermediate node. The label mapping packet carries a NO-ECMP property flag, and is transferred to the upstream LSRs from one hop to another.

In FIG. 6, R5 sends the label mapping packet that carries the NO-ECMP property flag to R3 and R4 only after R3 and R4 send a label mapping packet to the upstream R2. The packet is transferred to the upstream LSRs from one hop to another.

304. The intermediate LSR receives the label mapping packet that carries the NO-ECMP property flag, updates the information in the routing table, and sends the label mapping packet that carries the NO-ECMP property flag to the upstream LSR.

As shown in FIG. 6, the intermediate R3 and R4 receive the label mapping packet sent by the downstream R5 and knows that ECMP property flag about FEC5.5.5.9 is NO-ECMP which indicates that setting up an ECMP route is not permitted. Therefore, R3 and R4 update their own records, for example, update the ECMP flag of FEC5.5.5.9 to NO-ECMP, and send the label mapping packet that carries the NO-ECMP property flag to the upstream R2.

305. The upstream LSR receives the label mapping packet that carries the NO-ECMP property flag, selects one of the bound labels to be used as the label of the FEC and unbinds the rest of the bound labels.

In FIG. 6, it is assumed that the upstream LSR is R2. After receiving the label mapping packet that carries the NO-ECMP property flag sent by R3 and R4, R2 knows that the ECMP property flag about FEC5.5.5.9 is NO-ECMP, and finds that the corresponding FEC5.5.5.9 in the locally stored routing table is already bound to two labels (1024 and 1025), namely, finds existence of equal cost paths. Therefore, according to the local policy, R2 selects one of the labels (for example, 1024) to be used as the label of the FEC, and unbinds the rest of the bound labels (for example, 1025). In this way, only one path is selected.

306. The label mapping packet is sent to the next-hop upstream LSR until the packet arrives at the ingress node. The sent label mapping packet carries the ECMP property flag which is the same as the flag in the received label mapping packet.

After the LSR that receives the label mapping packet performs steps 302-305, the LSR sends the label mapping packet to the upstream LSR. The upstream LSR that receives the packet repeats the operations in steps 302-305, and the sending process goes on. All nodes in the MPLS network can obtain the NO-ECMP property flag, and the corresponding non-ECMP route is set up according to the flag.

The method for setting up an LSP in this embodiment is based on the label distribution process in the DU Independent mode. An ECMP property flag is preset for the specific FEC on the egress node; the intermediate LSR may send the label mapping packet to the upstream LSR before receiving the label mapping packet sent by the downstream LSR; because the ECMP property flag is sent by the egress node and the FEC of the intermediate LSR may be already bound to multiple labels, the intermediate node selects one of the labels to be used as the label of the FEC after receiving the label mapping packet that carries a NO-ECMP flag from the downstream LSR, and unbinds the rest of the bound labels. In this way, only one route is selected for binding the label, and a NO-ECMP LSP (namely, non-ECMP LSP) is set up for the FEC.

Embodiment 4

Figure 8:
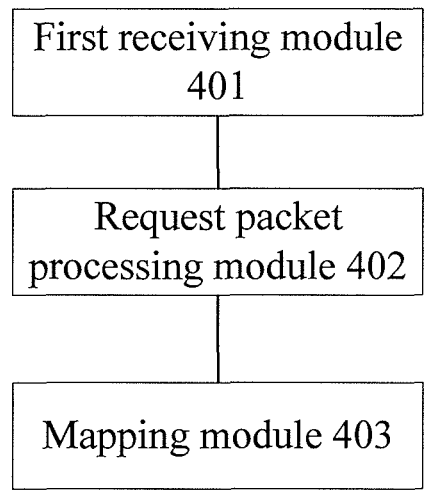
FIG. 8 shows a structure of a network node in the fourth embodiment of the present invention.

As shown in FIG. 8, a network node provided in this embodiment includes:

a first receiving module 401, configured to receive a label request packet that carries an ECMP property flag of a FEC;

a request packet processing module 402, configured to send the label request packet to a next-hop node according to the property flag; and a mapping module 403, configured to perform label mapping according to a path of the label request packet, distribute a label based on the FEC, and set up an LSP.

In practice, the network node may be an LSR.

Further, the request packet processing module 402 may include a first processing unit, which is configured to select one of multiple next-hop nodes to receive the label request packet if the property flag indicates no permission of setting up ECMP routes and the multiple next-hop nodes exist.

The mapping module 403 may include:

a label binding module, configured to distribute a label based on the FEC if the label request packet received by the first receiving module 401 indicates that setting up an ECMP route is not permitted; and a sending unit, configured to send the label mapping packet.

In this embodiment, the LDP protocol packet is extended so that the label request packet carries a flag indicating that setting up an ECMP route is permitted or setting up an ECMP route is not permitted; in the process of setting up an LSP, the setup of an ECMP route is prevented for the FEC that imposes special requirements; in the process of setting up an LSP, the property flag of the ECMP route is carried in the packet, the setup of an ECMP route is prevented automatically without the need of setting up every LSR on the LSP, the problems brought by the ECMP are prevented (for example, disorder of packets, congestion of some links, and difficulty of OAM), and management and maintenance of the MPLS network are facilitated.

Embodiment 5

Figure 9:
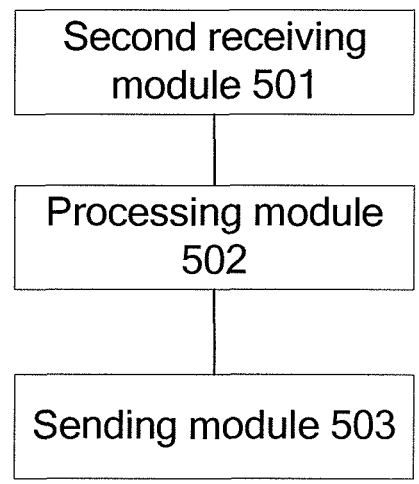
FIG. 9 shows a structure of a network node in the fifth embodiment of the present invention.

As shown in FIG. 9, a network node provided in this embodiment includes:

a second receiving module 501, configured to receive a label mapping packet that carries an ECMP property flag of a FEC;

a processing module 502, configured to distribute a label based on the FEC according to the property flag; and a sending module 503, configured to send the label mapping packet.

In practice, the network node may be an LSR.

Further, the processing module 502 may include:

a checking unit, configured to check whether a label in a routing table is bound to the FEC if the property flag indicates that setting up an ECMP route is not permitted;

a second processing unit, configured to distribute a label based on the FEC if the checking unit determines that no label in the routing table is bound to the FEC; and a third processing unit, configured to use the label as the label of the FEC, or unbind the label and distribute a new label based on the FEC, if the checking unit determines that a label in the routing table is bound to the FEC.

In this embodiment, the LDP protocol packet is extended so that the label mapping packet carries a flag indicating that setting up an ECMP route is permitted or setting up an ECMP route is not permitted; in the process of setting up an LSP, the setup of an ECMP route is prevented for the FEC that imposes special requirements; in the process of setting up an LSP, the property flag of the ECMP route is carried in the packet, the setup of an ECMP route is prevented automatically without the need of setting up every LSR on the LSP, the problems brought by the ECMP are prevented (for example, disorder of packets, congestion of some links, and difficulty of OAM), and management and maintenance of the MPLS network are facilitated.

Embodiment 6

Figure 10:
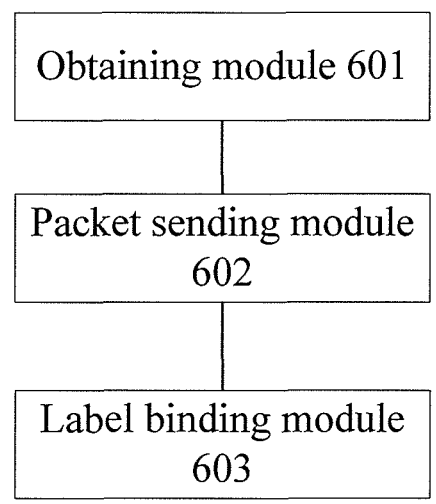
FIG. 10 shows a structure of an edge network node in the sixth embodiment of the present invention.

As shown in FIG. 10, an edge network node provided in this embodiment includes:

an obtaining module 601, configured to obtain an ECMP property flag of a FEC;

a packet sending module 602, configured to send a label request packet or label mapping packet that carries the ECMP property flag of the FEC; and a label binding module 603, configured to distribute a label based on the FEC.

In practice, the NMS may configure the edge network node so that the edge network node can obtain the ECMP property flag of the FEC; the edge network node may be an ingress node or egress node.

In this embodiment, the LDP protocol packet is extended so that the edge network node obtains the ECMP flag indicating permission or no permission of setting up ECMP routes; in the process of setting up an LSP, the setup of an ECMP route is prevented for the FEC that imposes special requirements; in the process of setting up an LSP, the property flag of the ECMP route is carried in the packet, the setup of an ECMP route is prevented automatically without the need of setting up every LSR on the LSP, the problems brought by the ECMP are prevented (for example, disorder of packets, congestion of some links, and difficulty of OAM), and management and maintenance of the MPLS network are facilitated.

Embodiment 7

A system provided in this embodiment includes:

an edge network node, configured to obtain an ECMP property flag of a FEC, send a label request packet or label mapping packet that carries the ECMP property flag of the FEC, and distribute a label based on the FEC; and an intermediate network node, configured to receive the label request packet or label mapping packet that carries the ECMP property flag of the FEC; send the label request packet to a next-hop node according to the property flag, perform label mapping according to a path of the label request packet, distribute a label based on the FEC, and set up an LSP; and distribute a label based on the FEC according to the property flag, and send the label mapping packet.

In the system provided in this embodiment, the LDP protocol packet is extended so that the label mapping packet or label request packet carries a flag indicating that setting up an ECMP route is permitted or setting up an ECMP route is not permitted; in the process of setting up an LSP, the setup of an ECMP route is prevented for the FEC that imposes special requirements; in the process of setting up an LSP, the property flag of the ECMP route is carried in the packet, the setup of an ECMP route is prevented automatically without the need of setting up every LSR on the LSP, the problems brought by the ECMP are prevented (for example, disorder of packets, congestion of some links, and difficulty of OAM), and management and maintenance of the MPLS network are facilitated.

The embodiments of the present invention may be implemented through software, and the software may be stored in a readable storage medium such as computer hard disk, floppy disk, or CD-ROM.

The above descriptions are merely preferred embodiments of the present invention, but are not intended to limit the scope of the present invention. Any modifications, variations or replacement that can be easily derived by those skilled in the art without departing from the spirit and scope of the invention shall fall within the protection scope of the present invention.

What is claimed is:

1. A method for setting up a Label Switching Path (LSP), the method comprising:
   sending, by an ingress edge node, a label request packet to a downstream node, wherein the label request packet carries an Equal Cost Multi-Path (ECMP) property flag of a Forwarding Equivalence Class (FEC);
   sending, by the downstream node that receives the label request packet, the label request packet to a next-hop node according to the property flag;
   performing, by the node that receives the label request packet, label mapping according to a path of the label request packet, distributing a label based on the FEC, and setting up an LSP;
   wherein the ECMP property flag indicates setting up an ECMP route is permitted or setting up an ECMP route is not permitted; and
   wherein sending the label request node according to the property flag comprises:
   selecting, by the downstream node, one of multiple next-hop nodes to receive the label request packet if the property flag indicates that setting up an ECMP route is not permitted and the downstream node has the multiple next-hop nodes.

2. The method according to claim 1, wherein:
   the performing, by the node that receives the label request packet, label mapping according to the path of the label request packet, distributing a label based on the FEC, and setting up the LSP comprises:
   by the node that receives the label request packet indicating that setting up an ECMP route is not permitted, distributing a label based on the FEC, sending the label mapping packet that carries the label to an upstream node, performing label mapping, and setting up the LSP.

3. The method according to claim 1, further comprising:
   performing configuration for the ingress edge node, so as to enable the ingress edge node to obtain the ECMP property flag of the FEC through the configuration.

4. A method for setting up a Label Switching Path (LSP), the method comprising:
   sending, by an egress edge node, a label mapping packet to an upstream node of the egress edge node, wherein the label mapping packet carries an Equal Cost Multi-Path (ECMP) property flag of a Forwarding Equivalence Class (FEC);
   distributing, by the upstream node that receives the label mapping packet, a label based on the FEC according to the property flag, and sending the label mapping packet to a next-hop upstream node of the upstream node;
   distributing, by an ingress edge node that receives the label mapping packet, a label based on the FEC, and setting up an LSP;
   wherein the ECMP property flag indicates setting up an ECMP route is permitted or setting up an ECMP route is not permitted; and
   wherein distributing the label based on the FEC according to the property flag comprises:
   checking, by the upstream node that receives the label mapping packet, whether a label in a routing table is bound to the FEC if the property flag indicates that setting up an ECMP route is not permitted, and
   distributing a label if determining that no label in the routing table is bound to the FEC, or
   if determining that a label in the routing table is bound to the FEC, using the label as the label of the FEC or unbinding the label in the routing table and distributing a new label based on the FEC.

5. The method according to claim 4, further comprising:
   sending, by an intermediate node, the label mapping packet to an upstream node of the intermediate node before receiving the label mapping packet sent by a downstream node of the intermediate node;
   distributing, by the upstream node of the intermediate node, a label based on the FEC;
   receiving, by the intermediate node, the label mapping packet sent by the downstream node of the intermediate node, and sending the label mapping packet to the upstream node of the intermediate node again, wherein the label mapping packet carries the ECMP property flag of the FEC;

obtaining, by the upstream node of the intermediate node, the ECMP property flag of the FEC; and selecting, by the upstream node of the intermediate node, one of labels already bound to the FEC for using the label as the label of the FEC and unbinding the rest of the labels if the property flag indicates that setting up an ECMP route is not permitted.

6. The method according to claim 4, further comprising:

performing configuration for the egress edge node, so as to enable the egress edge node to obtain the ECMP property flag of the FEC through the configuration.

7. A network node, comprising:

a first receiving module, configured to receive a label request packet that carries an Equal Cost Multi-Path (ECMP) property flag of a Forwarding Equivalence Class (FEC);

a request packet processing module, configured to send the label request packet to a next-hop node according to the property flag;

a mapping module, configured to perform label mapping according to a path of the label request packet, distribute a label based on the FEC, and set up an LSP; and wherein the request packet processing module comprises:

a first processing unit, configured to select one of multiple next-hop nodes to receive the label request packet if the property flag indicates that setting up an ECMP route is not permitted and the multiple next-hop nodes exist.

8. The network node according to claim 7, wherein the mapping module comprises:

a label binding module, configured to distribute a label based on the FEC if the label request packet received by the first receiving module indicates that setting up an ECMP route is not permitted; and a sending unit, configured to send the label mapping packet.

9. The network node according to claim 7, the network node further comprising:

a second receiving module, configured to receive a label mapping packet that carries an Equal Cost Multi-Path (ECMP) property flag of a Forwarding Equivalence Class (FEC);

a processing module, configured to distribute a label based on the FEC according to the property flag; and a sending module, configured to send the label mapping packet.

10. The network node according to claim 9, wherein the processing module comprises:

a checking unit, configured to check whether a label in a routing table is bound to the FEC if the property flag indicates that setting up an ECMP route is not permitted;

a second processing unit, configured to distribute a label based on the FEC if the checking unit determines that no label in the routing table is bound to the FEC; and a third processing unit, configured to use the label as the label of the FEC, or unbind the label and distributing a new label based on the FEC, if the checking unit determines that a label in the routing table is bound to the FEC.

11. The network node according to claim 7, wherein the network node is an edge network node.

* * * * *

UNITED STATES PATENT AND TRADEMARK OFFICE
CERTIFICATE OF CORRECTION

| | | |
|---|---|---|
| PATENT NO. | : 8,462,788 B2 | Page 1 of 1 |
| APPLICATION NO. | : 13/102871 | |
| DATED | : June 11, 2013 | |
| INVENTOR(S) | : Wei Cao and Xinchun Guo | |

It is certified that error appears in the above-identified patent and that said Letters Patent is hereby corrected as shown below:

In the Claims

Column 18, Claim 1, line 1, after "request" insert -- packet to the next-hop --.

Signed and Sealed this
Twenty-third Day of September, 2014

Michelle K. Lee
*Deputy Director of the United States Patent and Trademark Office*